(12) United States Patent
Williamson

(10) Patent No.: US 11,559,859 B2
(45) Date of Patent: Jan. 24, 2023

(54) WELD COUPON DESTRUCTIVE TEST DEVICE

(71) Applicant: Tracy Williamson, Bloomfield, NM (US)

(72) Inventor: Tracy Williamson, Bloomfield, NM (US)

(*) Notice: Subject to any disclaimer, the term of this patent is extended or adjusted under 35 U.S.C. 154(b) by 3 days.

(21) Appl. No.: 17/444,214

(22) Filed: Aug. 2, 2021

(65) Prior Publication Data
US 2021/0354249 A1 Nov. 18, 2021

Related U.S. Application Data

(63) Continuation of application No. 16/256,345, filed on Jan. 24, 2019, now Pat. No. 11,103,961.

(60) Provisional application No. 62/623,853, filed on Jan. 30, 2018.

(51) Int. Cl.
| | |
|---|---|
| *B23K 31/12* | (2006.01) |
| *G01N 3/20* | (2006.01) |
| *G01N 3/22* | (2006.01) |
| *G01N 3/42* | (2006.01) |
| *G09B 19/24* | (2006.01) |

(52) U.S. Cl.
CPC ............. *B23K 31/125* (2013.01); *G01N 3/20* (2013.01); *G01N 3/22* (2013.01); *G01N 3/42* (2013.01); *G01N 2203/0296* (2013.01); *G09B 19/24* (2013.01)

(58) Field of Classification Search
None
See application file for complete search history.

(56) References Cited

U.S. PATENT DOCUMENTS

| | | | |
|---|---|---|---|
| 2,053,205 | A | 9/1936 | Ragonnet |
| 2,959,051 | A | 11/1960 | Simek |
| 3,500,679 | A | 3/1970 | Smith |
| 3,994,158 | A | 11/1976 | Weinhold |
| 4,520,655 | A | 6/1985 | Owens |
| 4,610,166 | A | 9/1986 | Elder |
| 4,625,563 | A | 12/1986 | Dawson et al. |
| 4,656,872 | A | 4/1987 | Fischer |
| 5,341,696 | A | 8/1994 | Benedikt |
| 5,602,341 | A | 2/1997 | Lee et al. |

(Continued)

FOREIGN PATENT DOCUMENTS

CN 206818520 12/2017

*Primary Examiner* — Peter J Macchiarolo
*Assistant Examiner* — Jermaine L Jenkins
(74) *Attorney, Agent, or Firm* — Mark D. Trenner; Trenner Law Firm, LLC

(57) ABSTRACT

A weld coupon destructive test device includes a support base. A plunger connected to the support base and movable between a first position and a second position along a length of the support base. A handle to operate the plunger between the first position and the second position. A header on the support base, the header configured to press a weld coupon between the header and the plunger, the header having a first support end and a second support end, the header having a depression formed between the first support end and the second support end. The weld coupon rests between the first support end and the second support end of the header, and the weld coupon is pressed into the depression formed between the first support end and the second support end of the header.

20 Claims, 9 Drawing Sheets

(56) References Cited

U.S. PATENT DOCUMENTS

| | | | |
|---|---|---|---|
| 6,350,533 B1 | 2/2002 | Goto | |
| 6,848,322 B2 | 2/2005 | Scarborough | |
| 7,284,447 B2 | 10/2007 | Scarborough | |
| 7,426,855 B2 | 9/2008 | Aubele | |
| 7,624,608 B1 | 12/2009 | Karty | |
| 8,359,892 B1 | 1/2013 | Karty | |
| 9,193,010 B2* | 11/2015 | Miyazaki | G01N 3/00 |
| 9,623,465 B1 | 4/2017 | Bergstrom | |
| 10,052,710 B2* | 8/2018 | Sigler | B23K 11/20 |
| 10,259,071 B2* | 4/2019 | Sigler | B23K 35/0205 |
| 2004/0154408 A1 | 8/2004 | Scarborough | |

* cited by examiner

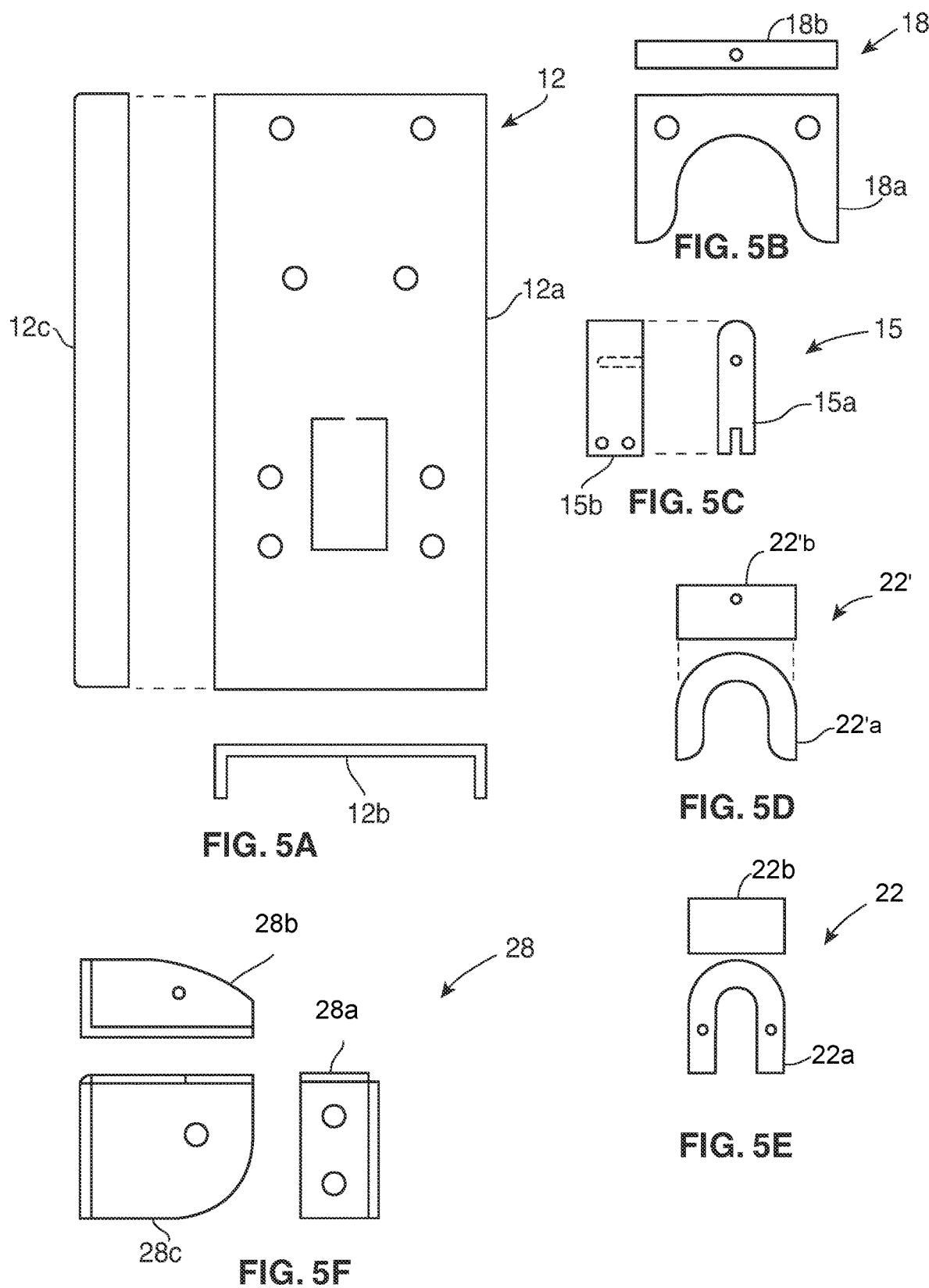

WELD COUPON DESTRUCTIVE TEST DEVICE

CROSS REFERENCE TO RELATED APPLICATIONS

This application is a continuation of U.S. patent application Ser. No. 16/256,345 filed Jan. 24, 2019 for "Weld Coupon Destructive Test Device" of Tracy Williamson, which claims the priority benefit of U.S. Provisional Patent Application No. 62/623,853 filed Jan. 30, 2018 for "Weld Coupon Destructive Test Unit" of Tracy Williamson, each hereby incorporated by reference in its entirety as though fully set forth herein.

BACKGROUND

Metal fabrication often requires certification of the welds quality to be determined. After a weld is completed the weld is cut to a sized coupon for bending or breaking for inspection purposes. The device bending and breaking the coupons is often powered by electricity, air, or hydraulics due to the force required to bend a metal weld coupon. No device currently exists to perform the bending and breaking of the weld coupon without the use of external power sources.

BRIEF DESCRIPTION OF THE DRAWINGS

FIGS. 2-4 and 5A-G are component views of an example weld coupon destructive test device.

DETAILED DESCRIPTION

Figure 1:
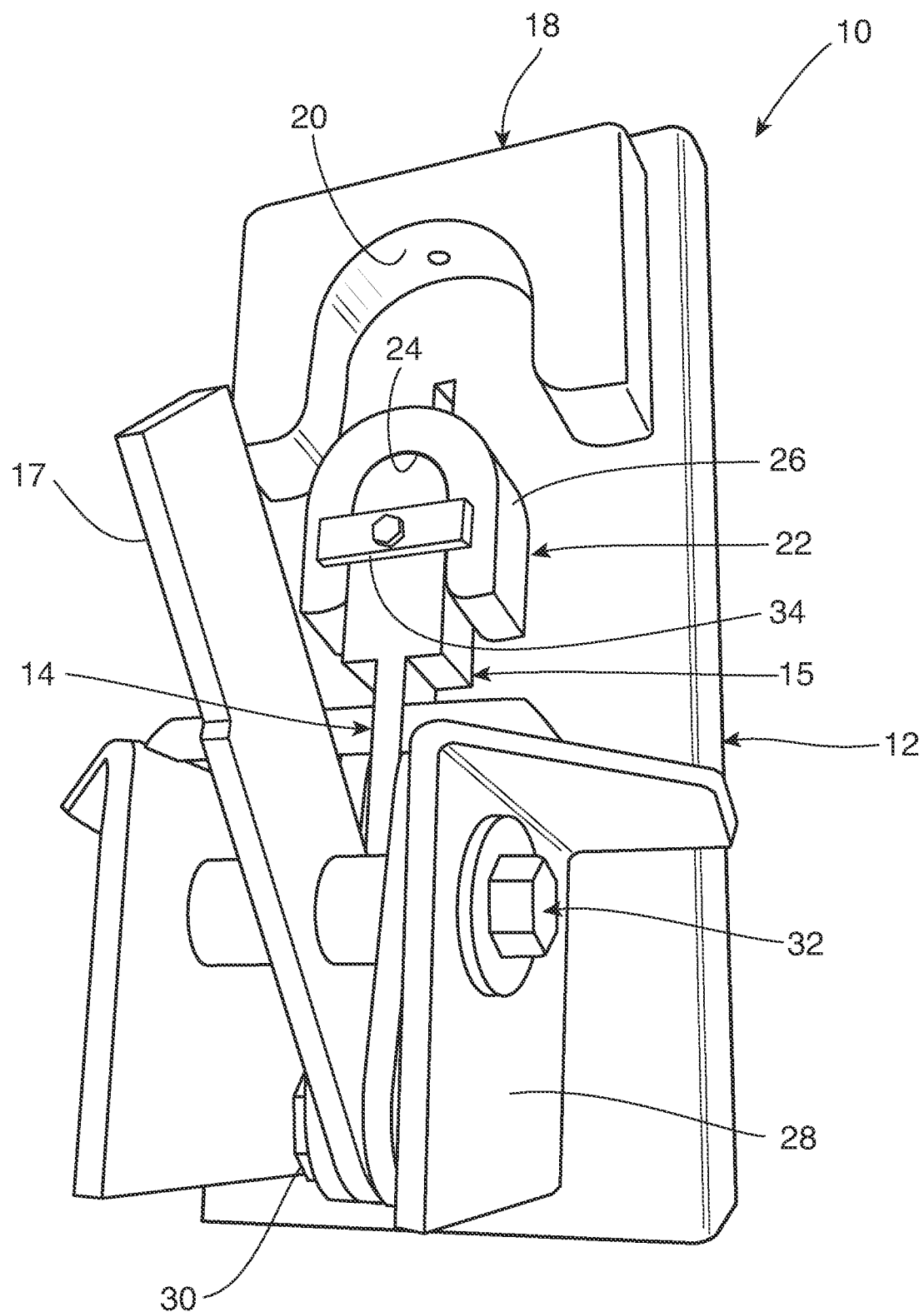
FIG. 1 is a perspective view of an example weld coupon destructive test device.

An example weld coupon destructive test device is disclosed which may be implemented in a machine shop and/or in the field. In a machine shop, the device may be mounted on a workbench or other suitable base. In the field, the device may be mounted to a hitch mount on a truck or other suitable base (mobile or stationary). In an example, the weld coupon destructive test device can be operated manually, without need for an external power source.

A weld coupon destructive test device includes a support base. A plunger is connected to the support base and is movable along a length of the support base by a handle mounted to rotate on a pivot base on the support base. A header on the support base has a guide surface configured to press a weld coupon between the guide surface and the head of the plunger. A guide shoe is configured to fit against the guide surface of the header, the curved guide shoe has a first face and a second face, the first face is curved to conform to the head on the plunger, and the second face is curved to conform to the curved guide surface of the header. The handle is operable in a slotted bar to break a weld coupon under pressure.

An example weld coupon destructive test device includes a detachable handle, the necessary bend guide surfaces and plunger, the mount assembly, the "nick break" attachment, and the mechanism to guide the force to the plunger. In an example, the guide shoe is fixed onto the housing and the plunger is pivotally mounted to the housing.

The plunger is operable between an open position and a closed position. In the open position, a weld coupon is inserted against the guide shoes and prepared for operation. The plunger is then pivoted into a closed position, for example by a user pressing (or lifting) on a handle. This motion causes the plunger to press the weld coupon against the guide shoes to form a desired shape.

In an example, the guide shoes and plunger are provided as a set. For example, a guide shoes and plunger may be provided as shown in the drawings to produce a substantially U-shaped weld coupon. The guide shoes and plunger are interchangeable with other guide shoes and plungers to produce different shapes in the weld coupons. Other shaped weld coupons may be produced according to the mating shapes of the guide shoes and plunger provided.

The weld coupon destructive test device may be lightweight and portable. The device can be readily transported and operated by an individual user. The device does not require electricity or hydraulics to operate, making it robust under a variety of operating conditions. The device is generally safe, if proper operating procedures are followed, as the only pressure is by human application. It is fast to and easy to operate with little or no training.

Before continuing, it is noted that as used herein, the terms "includes" and "including" mean, but is not limited to, "includes" or "including" and "includes at least" or "including at least." The term "based on" means "based on" and "based at least in part on."

FIG. 1 is a perspective view of an example weld coupon destructive test device 10. The device 10 can be implemented to bend and/or break a weld coupon 1 (see, e.g., FIG. 6). The device 10 can be readily installed in any suitable location, such as but not limited to, on a workbench or on a hitch receiver on a truck.

Figure 6:
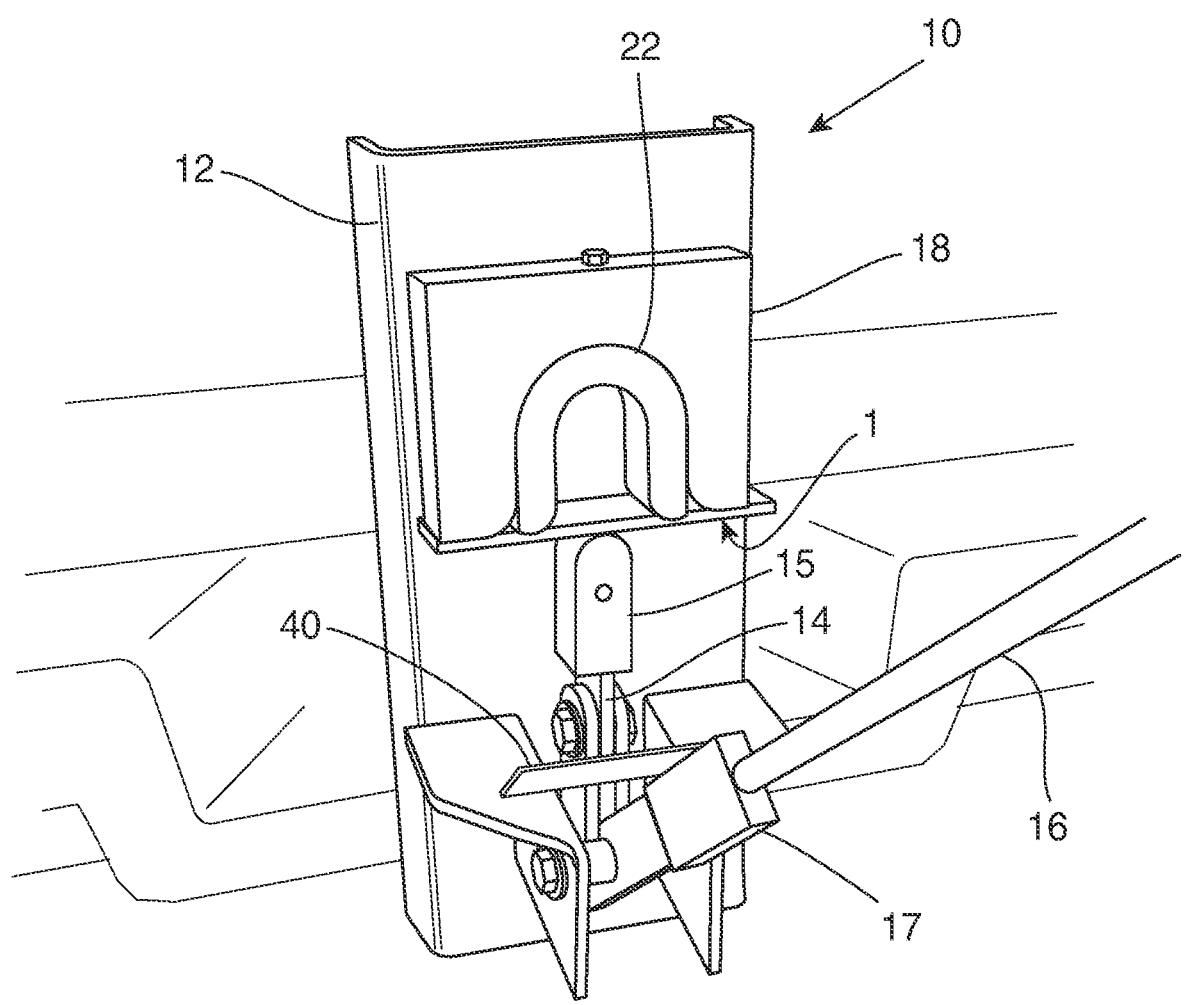
FIGS. 6-8 illustrate example operations of the weld coupon destructive test device to bend a weld coupon.
Figure 7:
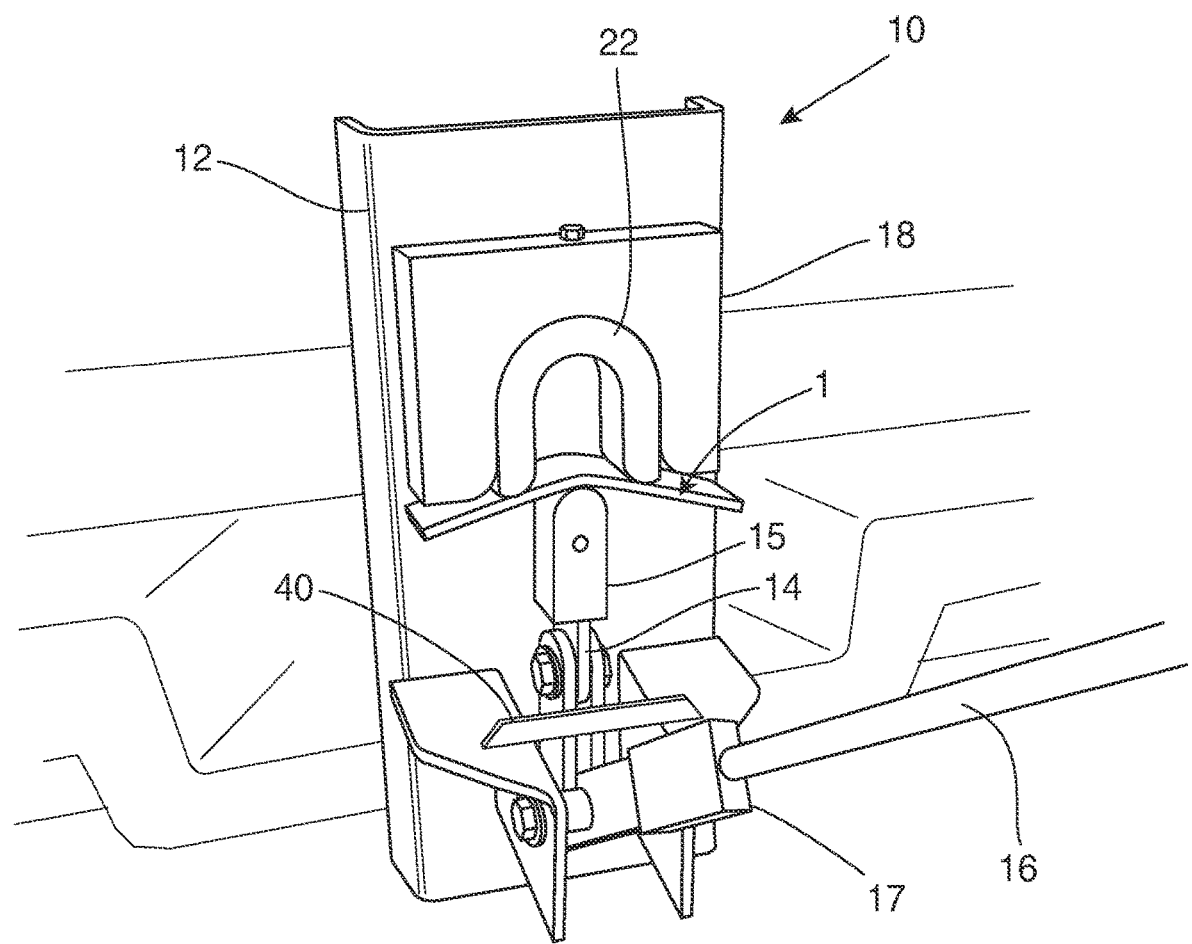
Figure 8:
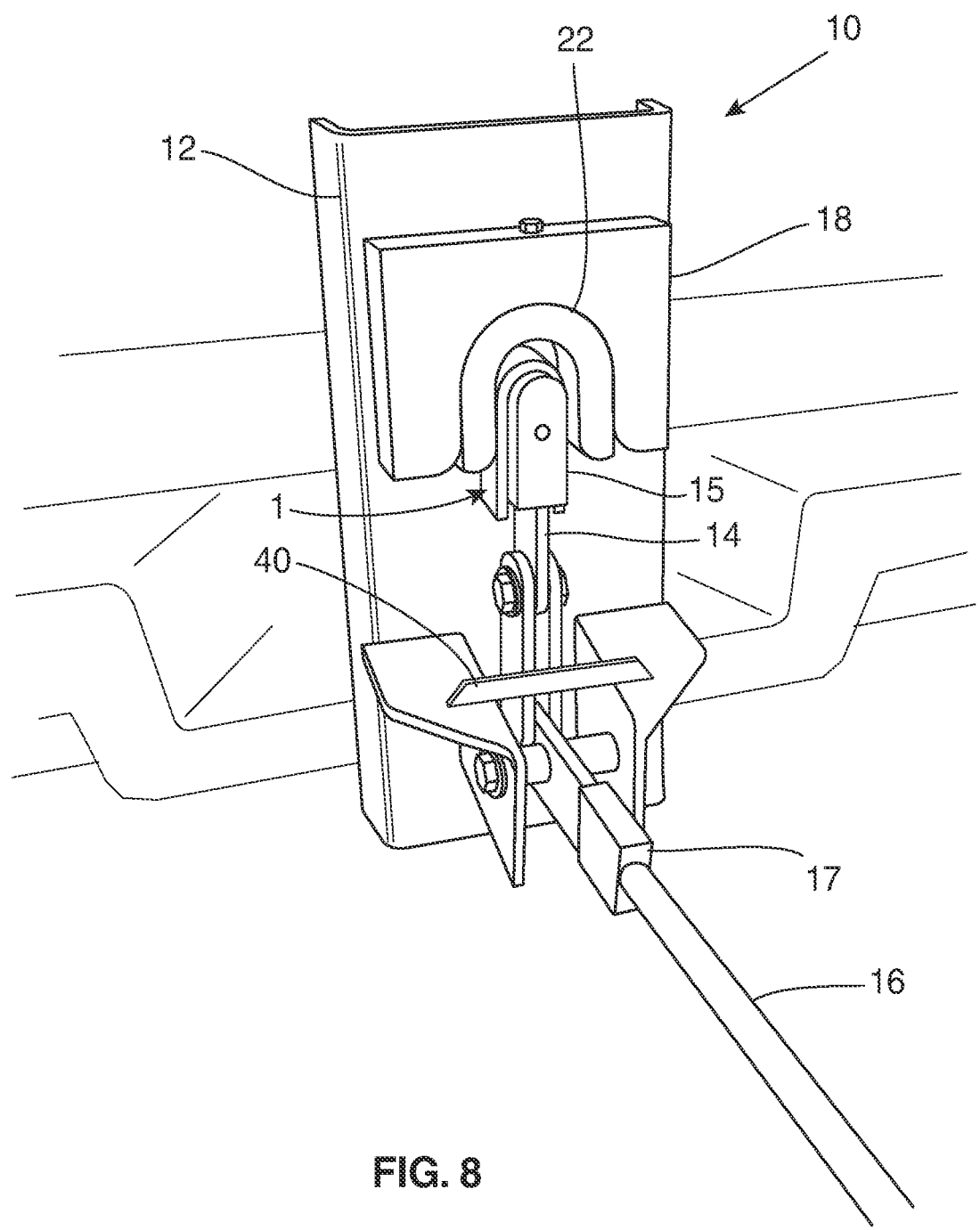
Figure 9:
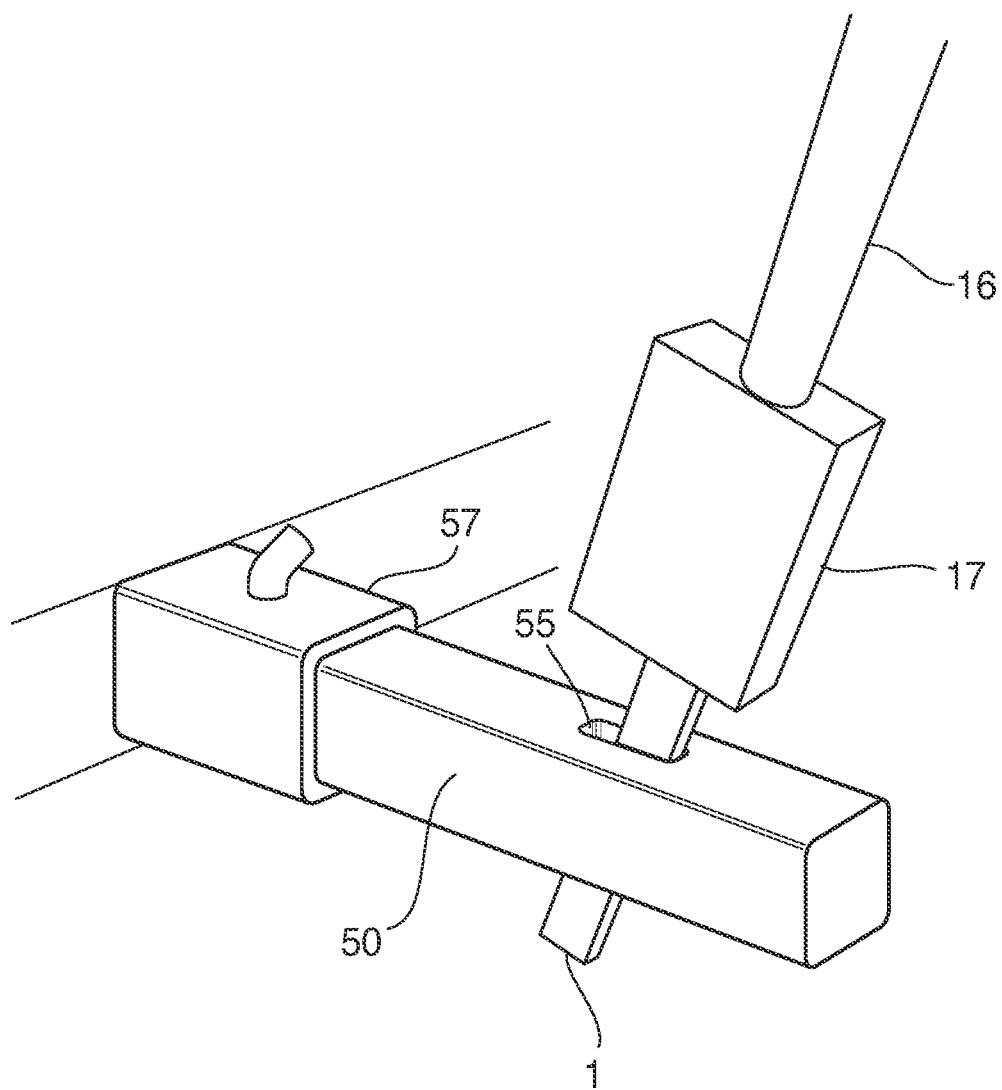
FIGS. 9-10 illustrate example operations of the weld coupon destructive test device to bend and break a weld coupon.
Figure 10:
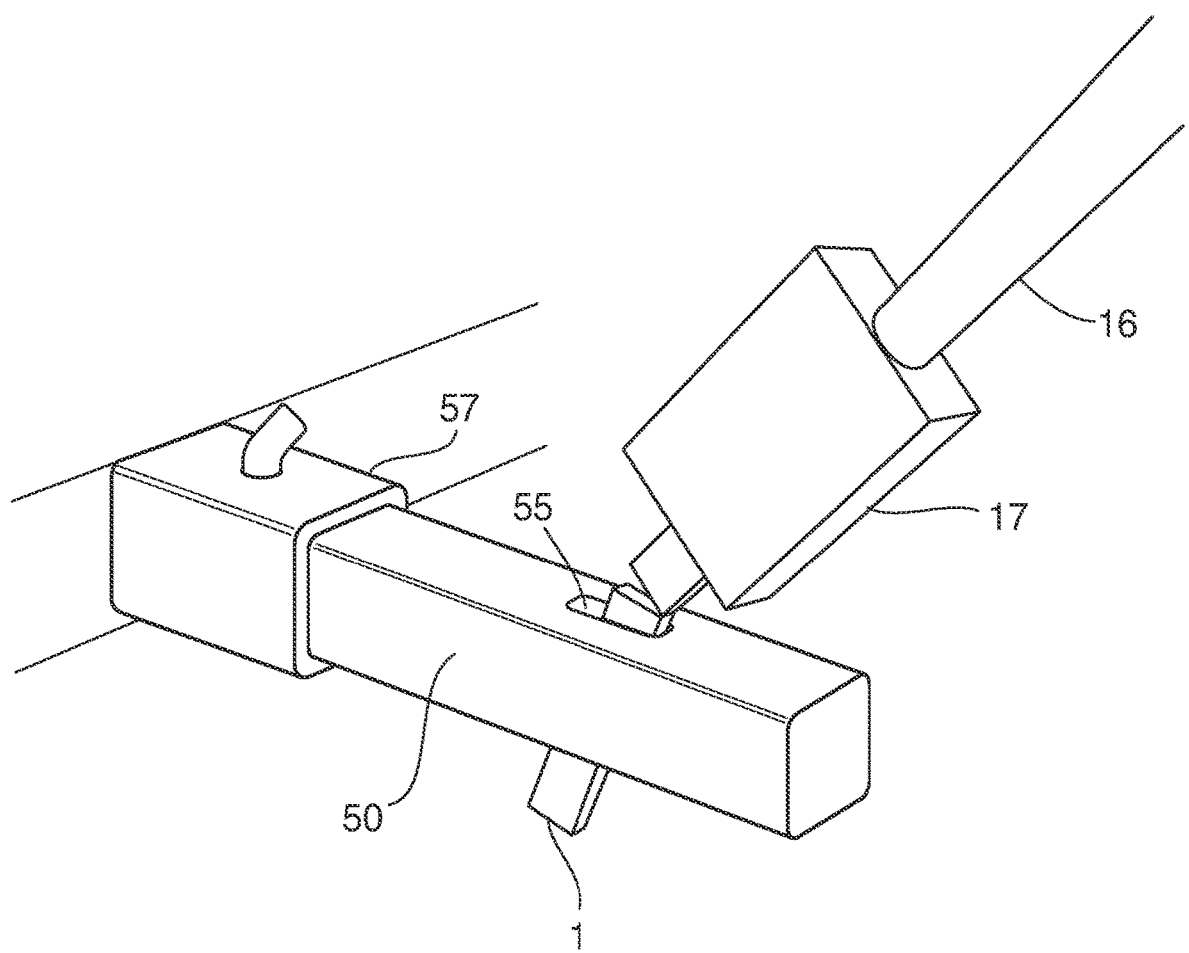

An example weld coupon destructive test device 10 includes a support base 12. The support base 12 may have a mount(s) for mounting the support base to a workbench, vehicle, or other desired location. A plunger 14 is mounted on the support base 12. A handle 16 is provided to operate the plunger 14 between a first position (e.g., lower position as shown in FIG. 6) and a second position (e.g., raised position as shown in FIG. 8) along a length of the support base (e.g., as illustrated in FIGS. 6-8). The handle may be removable, e.g., so that it can also be used to break a weld coupon, as shown in FIGS. 9-10.

A header 18 is provided on the support base 12. The header 18 has a guide surface 20 configured to press a weld coupon 1 between the guide surface 20 and the plunger 14. The plunger 14 is movable to the first position (e.g., FIG. 6) for inserting the weld coupon 1 against the header 18. The plunger 14 is then movable to the second position (e.g., FIGS. 6-8) so that the plunger presses the weld coupon 1 against the header 18 to bend and/or form a desired shape of the weld coupon 1 (e.g., as shown in FIG. 8).

In an example, the plunger 14 has a curved head 15. The header 18 has a guide surface 20 conforming to the head 15 on the plunger 14. The guide surface 20 may be curved. The head 15 may also be curved. A guide shoe 22 may be provided, having a first face 24 and a second face 26. The first face 24 conforms to (e.g., is curved in FIG. 1 to match) the head 15 on the plunger 14. The second face 26 also conforms to (e.g., is curved in FIG. 1 to match) the curved guide surface 20 of the header 18.

In an example, the plunger 14 is mounted to a receiver 17 for the handle 16. The receiver 17 is linked to the plunger 14 via a pivot 30 (e.g., a pin or a bolt). The receiver 17 pivotally mounted to a pivot base 28, e.g., via a pivot 32 such as a pin or bolt. The pivot base 28 is mounted to the support base 12.

In an example, a fence 34 may be provided on a head portion 15 of the plunger 14. The fence 34 retains the weld coupon 1 against the support base 12 as the weld coupon 1 is pressed between the header 18 and the plunger 14, e.g., so that the weld coupon 1 does not pop off and out toward the operator.

In an example, the guide shoe 22 and head 15 of the plunger 14 are interchangeable with another guide shoe and head of the plunger. The guide shoe may have a different shape inner surface 24, e.g., to produce different shape weld coupons. In an example, the head 15 of the plunger 14 may also include different, interchangeable shapes.

Figure 2:
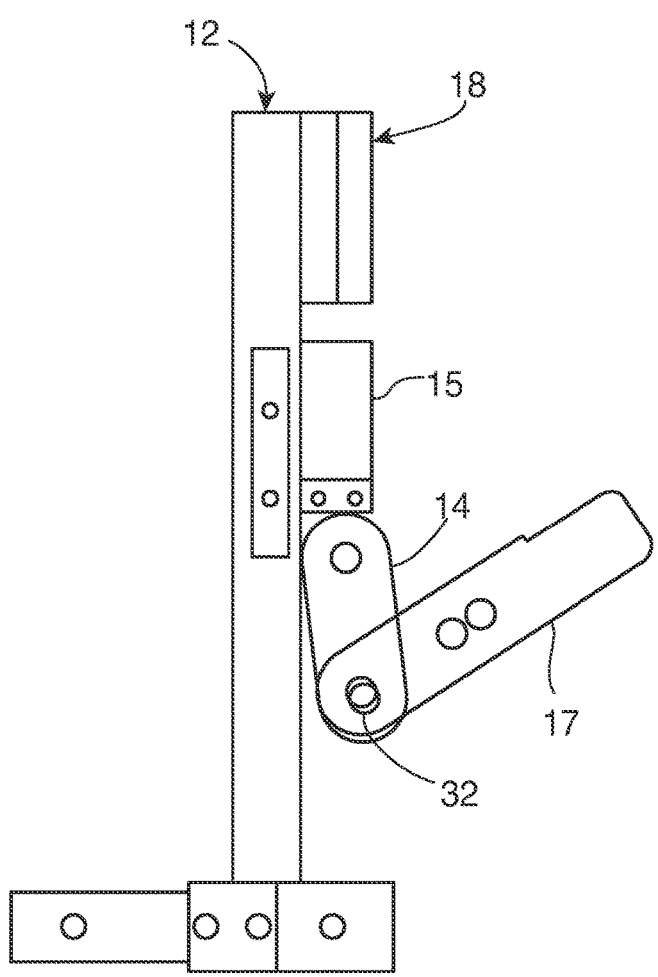
Figure 3:
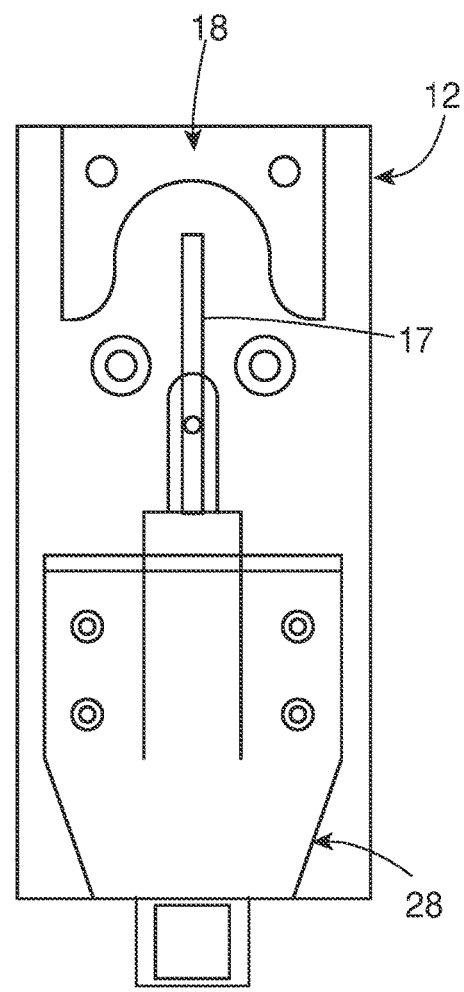
Figure 4:
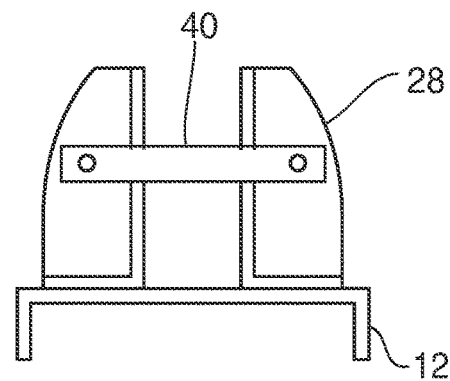

FIGS. 2-4 and 5A-G are component views of an example weld coupon destructive test device 10. FIG. 2 shows a side view of support base 12, plunger 14, head 15, receiver 17, and header 18 of the example weld coupon destructive test device 10. FIG. 3 shows a front view of support base 12, head 15, receiver 17, header 18, and pivot base 28 of the example weld coupon destructive test device 10. FIG. 4 shows a top view of support base 12, pivot base 28, and stop mechanism 40 of the example weld coupon destructive test device 10.

Figure 5G:
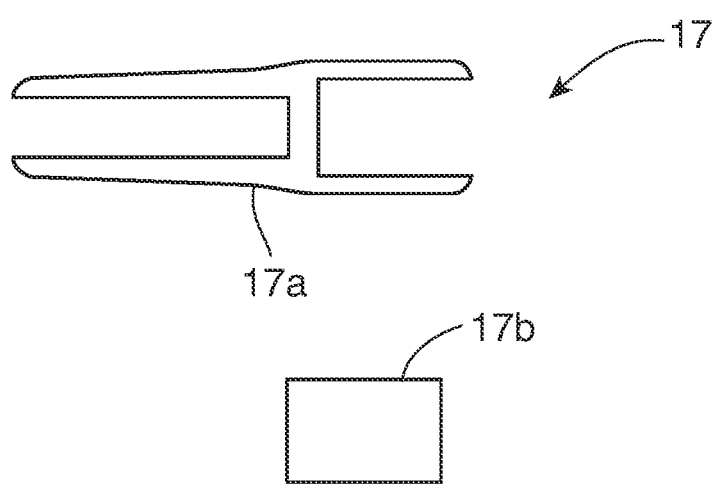

FIG. 5A shows a front view 12a, top view 12b, and side view of an example support base 12. FIG. 5B shows a front view 18a and top view 18b of an example header 18. FIG. 5C shows a front view 15a and top view 15b of an example head 15. FIG. 5D shows a front view 22'a and top view 22'b of an example insert 22' for the guide shoe 22. FIG. 5E shows a front view 22a and top view 22b of an example guide shoe 22. FIG. 5F shows a side view 28a, and top view 28b-c of an example pivot base 28. FIG. 5G shows a side view 17a, and top view 17b of an example end of the handle 17.

Before continuing, it should be noted that the examples described above are provided for purposes of illustration, and are not intended to be limiting. Other devices and/or device configurations may be utilized to carry out the operations described herein.

FIGS. 6-8 illustrate example operations of the weld coupon destructive test device to bend a weld coupon. Operating the handle 16 rotates the receiver 17 about the pivot 32 on the pivot base 28, and causes the plunger 14 to move between the first position (e.g., retracted from the header 18 or downward) and the second position (e.g., raised toward the header 18 or upward).

In an example, a stop mechanism 40 may be provided on the pivot base 28 to prevent the receiver 17, and thus the handle 16, from being moved beyond a preset location defined by the stop mechanism 40.

Movement of the handle 16 in a first direction (e.g., down in FIGS. 6 and 7) causes the plunger 14 to move in a second direction (e.g., up in FIGS. 6 and 7) that is opposite to the first direction and moves the plunger 14 toward the header 18 on the support base 28 (to the position shown in FIG. 8). Likewise, movement of the handle 16 in the opposite direction (e.g., up in FIG. 1) causes the plunger 14 to move in the opposite direction (e.g., down in FIG. 1) and moves the plunger 14 away from the header 18 on the support base 12.

Example operation includes setup, wherein a guide shoe 22 and plunger 14 are selected, along with a weld coupon 1 to be worked on. During operation, the weld coupon 1 to be worked on is inserted into the device 10 between the guide shoe 22 and plunger 14. The handle 16 is operated by the user to press down and bend the sample between the guide shoe 22 and plunger 14. Generally, the plunger 14 is the portion that is being moved by the operator. The sample is pressed against the guide shoes 22.

The weld coupon 1 bends according to the shape of the guide shoe 22 and plunger 14 being implemented. Any suitable size and/or shape guide shoe 22 and plunger 14 may be implemented to provide a wide variety of different shape press samples. The size and shape of the press samples produced may be based at least in part on the work being performed and the code requirements.

FIGS. 9-10 illustrate example operations of the weld coupon destructive test device 10 to bend and break a weld coupon 1. When the weld coupon 1 is to be broken, the weld coupon 1 is inserted into the appropriately sized slot(s) 55 formed in metal bar 50 of the device 10, as illustrated in FIG. 9. The metal bar 50 may be already inserted into a standard hitch receiver 57 on a truck or mounted on a workbench. The detachable handle 16 is placed over the weld coupon 1 (e.g., the same opening on the handle 16 that is positioned onto the receiver 17). Force is applied until the weld coupon 1 breaks or splits, as illustrated in FIG. 10.

The operations shown and described herein are provided to illustrate example implementations. It is noted that the operations are not limited to the ordering shown. Still other operations may also be implemented.

It is noted that the examples shown and described are provided for purposes of illustration and are not intended to be limiting. Still other examples are also contemplated.

The invention claimed is:

1. A weld coupon destructive test device, comprising:
   a support base;
   a plunger connected to the support base and movable between a first position and a second position along a length of the support base;
   a handle to operate the plunger between the first position and the second position;
   a header on the support base, the header configured to press a weld coupon between the header and the plunger, the header having a first support end and a second support end, the header having a depression formed between the first support end and the second support end;
   wherein the weld coupon rests between the first support end and the second support end of the header, and the weld coupon is pressed into the depression formed between the first support end and the second support end of the header.

2. The weld coupon destructive test device of claim 1, wherein the plunger is movable to the first position for inserting the weld coupon against the header, and then movable to the second position so that the plunger presses the weld coupon against the header to form a desired shape of the weld coupon.

3. The weld coupon destructive test device of claim 1, further comprising a curved head on the plunger.

4. The weld coupon destructive test device of claim 3, wherein the header conforms to the curved head on the plunger.

5. The weld coupon destructive test device of claim 3, further comprising a guide shoe having a first face and a second face, the first face curved to conform to the curved head on the plunger, and the second face curved to conform to the header.

6. The weld coupon destructive test device of claim 1, further comprising a pivot base mounted to the support base, wherein the handle is mounted to rotate on the pivot base.

7. The weld coupon destructive test device of claim 6, wherein the handle is linked to the plunger, wherein movement of the handle in a first direction causes the plunger to move in a second direction that is opposite to the first direction and moves the plunger toward the header on the support base.

8. The weld coupon destructive test device of claim 1, further comprising a stop mechanism to prevent the handle from being moved beyond a preset location defined by the stop mechanism.

9. The weld coupon destructive test device of claim 1, wherein a guide shoe and corresponding head of the plunger are interchangeable with another guide shoe and corresponding head of the plunger to produce different shape weld coupons.

10. The weld coupon destructive test device of claim 1, further comprising a mount on the support base to mount the support base to a workbench or vehicle.

11. The weld coupon destructive test device of claim 10, wherein the mount on the support base is configured with a coupler for a mating receiver tube of a trailer hitch assembly.

12. The weld coupon destructive test device of claim 1, wherein the handle is operable in a slotted bar to break a weld coupon under pressure applied by the handle.

13. A weld coupon destructive test device, comprising:
a support base;
a plunger connected to the support base and movable between a first position and a second position along a length of the support base;
a handle to operate the plunger between the first position and the second position;
a header on the support base;
a guide surface of the header configured to press a weld coupon between the guide surface and the plunger, the guide surface having a first support end and a second support end, the guide surface having a depression formed between the first support end and the second support end;
wherein the weld coupon rests between the first support end and the second support end of the guide surface, and the weld coupon is pressed into the depression formed between the first support end and the second support end; and
wherein the plunger is movable to the first position for inserting the weld coupon against the header, and then movable to the second position so that the plunger presses the weld coupon against the guide surface of the header to form a desired shape of the weld coupon.

14. The weld coupon destructive test device of claim 13, wherein the guide surface of the header conforms to a curved head on the plunger.

15. The weld coupon destructive test device of claim 13, wherein the guide shoe has a first face and a second face, the first face is curved to conform to the head on the plunger, and the second face is curved to conform to the guide surface of the header.

16. The weld coupon destructive test device of claim 13, further comprising a pivot base on the support base, wherein the handle is mounted to rotate on the pivot base.

17. The weld coupon destructive test device of claim 16, wherein the handle is linked to the plunger, wherein movement of the handle in a first direction causes the plunger to move in a second direction that is opposite to the first direction and moves the plunger toward the header on the support base.

18. The weld coupon destructive test device of claim 13, wherein the handle is operable in a slotted bar to break a weld coupon under pressure applied by the handle.

19. A weld coupon destructive test device, comprising:
a support base;
a plunger connected to the support base and movable between a first position and a second position along a length of the support base, the plunger having a curved head;
a handle to operate the plunger between the first position and the second position;
a pivot base on the support base, wherein the handle is mounted to rotate on the pivot base;
a header on the support base; and
a guide surface of the header configured to press a weld coupon between the guide surface and the plunger, the guide surface having a first support end and a second support end, the guide surface having a depression formed between the first support end and the second support end;
wherein the weld coupon rests between the first support end and the second support end of the guide surface, and the weld coupon is pressed into the depression formed between the first support end and the second support end; and
wherein the handle is linked to the plunger, wherein movement of the handle in a first direction causes the plunger to move in a second direction that is opposite to the first direction and moves the plunger toward the header on the support base;
wherein the plunger is movable to the first position for inserting a weld coupon against the header, and then movable to the second position so that the curved head of the plunger presses the weld coupon against the guide surface of the header to form a corresponding curved shape of the weld coupon.

20. The weld coupon destructive test device of claim 19, wherein the handle is operable in a slotted bar to break a weld coupon under pressure applied by the handle.

* * * * *